United States Patent [19]
Friedrich et al.

[11] Patent Number: 5,160,090
[45] Date of Patent: Nov. 3, 1992

[54] METHOD OF MAKING HIGH-STRENGTH BRAZED JOINTS

[75] Inventors: Christian Friedrich, Pflach; Nikolaus Reheis, Jerzens; Walter Thalmann, Breitenwang, all of Austria

[73] Assignee: Schwarzkopf Technologies Corporation, New York, N.Y.

[21] Appl. No.: 763,118

[22] Filed: Sep. 20, 1991

[30] Foreign Application Priority Data

Sep. 21, 1990 [AT] Austria .................. 1918/90

[51] Int. Cl.$^5$ ................ B23K 1/20
[52] U.S. Cl. .................. 228/121; 228/124; 228/165; 228/203
[58] Field of Search .......... 228/121, 122–124, 228/165, 203, 263.12

[56] References Cited

U.S. PATENT DOCUMENTS

| | | | |
|---|---|---|---|
| 3,710,170 | 1/1973 | Friedel | 313/330 |
| 4,111,572 | 9/1978 | Noone et al. | 228/124 |
| 4,394,953 | 7/1983 | Sonnweber et al. | 228/124 |
| 4,409,278 | 10/1983 | Jochum | 228/124 |
| 4,610,934 | 9/1986 | Boecker et al. | 228/122 |
| 4,793,543 | 12/1988 | Gainey et al. | 228/121 |
| 4,844,323 | 7/1989 | Kondo et al. | 228/121 |
| 5,058,799 | 10/1991 | Zsamboky | 228/121 |

FOREIGN PATENT DOCUMENTS

| | | |
|---|---|---|
| 362459 | 5/1981 | Austria . |
| 1652840 | 4/1971 | Fed. Rep. of Germany . |
| 1951383 | 4/1971 | Fed. Rep. of Germany . |
| 2759148 | 7/1979 | Fed. Rep. of Germany . |

OTHER PUBLICATIONS

English language abstracts for German references 1 652 840 and 2 759 148.

*Primary Examiner*—Samuel M. Heinrich
*Attorney, Agent, or Firm*—Morgan & Finnegan

[57] ABSTRACT

The invention relates to a method of making high-strength brazed joints in metal/ceramic and ceramic/ceramic composite materials. The brazing surface of the ceramic part is structured prior to brazing by introducing bores having an average diameter in the range of 50 μm–500 μm and a depth in the range of 100 μm–2 mm. Preferably, the structuring is effected by laser working. Brazing is subsequently carried out in a conventional manner. The resulting joint displays increased strength characteristics and resistance to thermal stresses over joints produced by conventional methods.

12 Claims, No Drawings

METHOD OF MAKING HIGH-STRENGTH BRAZED JOINTS

FIELD OF THE INVENTION

The invention relates to a method of making high-strength brazed joints in metal/ceramic and ceramic/ceramic composite materials, and more particularly, to a method of making high strength brazed joints in metal/ceramic and ceramic/ceramic composite materials in which the ceramic material surface to be brazed is structured before brazing in order to obtain an enlarged brazing surface area.

BACKGROUND

In a number of applications having special requirements, it is necessary to substitute, in place of uniform materials, specific composite materials. These composites are often formed by joining components made from different materials. Oftentimes, the individual components display widely differing properties.

For example, composite materials formed from graphite and high-melting metals such as molybdenum or tungsten have proven suitable for special high-temperature applications. As compared with one-component materials formed from high-melting metals, these composites allow a wider range of high-temperature applications, especially because of the improved heat storage capacity and because of the lower density of graphite.

One important application readily availing itself to the advantage of such a composite material includes, for example, rotating anodes for X-ray tubes.

Other metal/ceramic composite materials are also of technical interest and are increasingly used. Composite materials of ceramics such as $Al_2O_3$, $Si_3N_4$, SiC, TiO, TiN, TiC, $Zr)_2$ or AlN, with high-melting or other metals, may be mentioned as examples in this context.

Furthermore, ceramic/ceramic composite materials, formed by joining individual ceramic components having different properties, are also used for special applications.

Examples of products for which such composite materials are used include, without limitation, rotating anodes for X-ray tubes; first wall components, diverter plates, and limiters for fusion reactors; high tension switches; continuous casting molds; electrodes; and like applications.

The decisive feature for the usefulness of all these metal/ceramic and ceramic/ceramic composite materials is a mechanically good joint between the individual material components. In many cases, the joint must also be resistant to high temperatures. A brazing operation is often used to join the individual, different materials to one another, as this also ensures good thermal conductivity between the individual materials. Brazing materials such as Zr, AgCuTi, CuTi and NiTi have gained acceptance, especially for high-temperature applications.

A problem often encountered with these composite materials is that states of stress frequently arise, owing to the widely different coefficients of thermal expansion frequently displayed between the composite components to be joined. These stress states can impair the strength of the brazed joint and, in extreme cases, can cause destruction of the component.

In order to improve the strength of the brazed joint, it is conventional to increase the brazing surface area of the ceramic material. This can be achieved, for example, by introducing grooves or striae onto the brazing surfaces by special mechanical treatment, such as by means of a conventional turning or milling operation.

In German Auslegeschrift 1,951,383, which relates to a composite rotating X-ray tube anode of a high-melting metal part and one or more graphite parts fitted therein, it is proposed to provide the brazing surface of the graphite parts with certain structurings, such as grooves, which increase the surface area. However, this known structuring of the brazing surface is frequently insufficient to obtain satisfactory strength of the brazing joint.

Austrian Patent 362,459 describes a method of joining the individual parts of a rotating anode, composed of a high-melting metal with one or more graphite parts, by brazing. In this method, slots are introduced into the graphite surfaces which are to be brazed. The slots merge into bores which are perpendicular to the brazing surface and which penetrate the graphite parts. The bores penetrating the graphite parts allow the gases formed during brazing to escape to the outside, thereby largely avoiding the formation of cavities in the brazing material layer.

However, in practice this method does not result in a strength-increasing enlarged brazing surface, due to the small number of the bores employed and to their physical dimensions. The bores merely serve to discharge gases formed during the brazing operation. Therefore, even in the brazed joints produced by this method, the strength of the joint between the different materials frequently does not meet the stringent requirements for which the materials are intended in use, especially with respect to thermal shock resistance.

German Offenlegungsschrift 2,759,148 describes a method of making a brazed joint between parts of pyrolytic graphite, with one another or with a metallic part. The part consisting of pyrolytic graphite is provided with a recess into which the brazing material flows during the brazing step, thus filling the recess. The method is matched specifically to produce joints used in the construction of electronic tubes, where the parts to be joined are very thin, having thicknesses of between 20 and 100 μm. In the described embodiments, the recesses are exclusively made as bores or slots which completely penetrate the pyrolytic graphite part. This leads to a brazed joint in which the brazing material frequently flows off from the contacting surfaces of the composite components, and the brazing material escapes via the bore on the surfaces which are not in contact. The result is a punctiform joint resembling a riveted joint. Such a joint is not suitable for joining solid parts of large volume.

German Offenlegungsschrift 1,652,840 describes a method in which a metallic part and a ceramic part are joined by brazing. The brazing surface of the metal part is provided with capillary-active flow channels for the brazing material, preferably in the form of parallel striae. They may also be formed by a knurling operation. The disadvantage here is that, in many cases, even increasing the surface roughness in this way is not adequate to obtain the optimum strength of the brazed joint.

SUMMARY OF THE INVENTION

It is therefore an object of the present invention to provide a method of making high-strength brazed joints in metal/ceramic and ceramic/ceramic composite materials, which is suitable for joining solid parts and which improves the mechanical strength over that of known brazed joints, especially under thermal stress.

These and other objects of the invention are achieved by effecting the structuring of the brazing surface of the ceramic material by introducing bores therein. The bores penetrate the brazing surface of the ceramic component but do not penetrate completely through the ceramic material. The bores have an average diameter in the range of 50 μm–500 μm and a depth in the range of 100 μm –2mm.

The method according to the invention leads to a particularly good increase in surface area which, especially in the cases of low-strength reaction layers, leads to a surprisingly improved strength increase of the brazed joint. One cause of this surprising strength increase might be due to a crack-inhibiting effect that is achieved in the brazing material layer because of the special surface shaping. Furthermore, planned changes of the thermomechanical material properties in the transition zones between the brazing material and the composite components can be controlled by specially matching the bore diameters to bore depths. Especially in the case of anisotropic base materials, this matching advantageously leads to the creation of graduated transition zones with respect to these thermomechanical properties.

DETAILED DESCRIPTION OF THE PREFERRED EMBODIMENT

The state of stress in the overall composite material is considerably reduced by the surface shaping according to the invention. In composite materials which consist exclusively of ceramic materials, the structuring according to the invention of the brazing surface will, as a rule, be carried out on both the parts which are to be brazed. However, it is also conceivable and within the scope of the invention to provide the structuring only on one part.

It is particularly advantageous if the bores are shaped in a conical form tapering inward from the surface. This form allows the brazing material to penetrate the bores particularly well during the brazing step, because it promotes better flow of the brazing material into the bore over bores with straight-sided shapes.

Laser machining has proven to be a particularly advantageous way of forming the bores on the brazing surface. With the use of lasers, the bores can be formed in a particularly economical manner. Moreover, it has been found that, as a result of the laser machining process, the bores are automatically formed in the desired conical shape, because the laser beam may be focused at a focal point lying at the end of the bore.

The diameter and the depth of the bores, and the mutual spacing between the individual bores, depends on the specific properties of the materials which are to be brazed, and on the size of the brazing surfaces. In most cases, it will be expedient to form rows of bores which are as closely adjacent as possible. Moreover, overlapping of the individual bores is also conceivable.

As a rule, it has proven advantageous if at least 10% of the brazing surface is structured by means of bores. In certain cases, particularly in the case of materials which are difficult to work, it can also be sufficient to select a smaller proportion of the brazing surface for the structuring treatment. However, in no case should structuring occur over less than 1% of the brazing surface, since otherwise the desired effect of increasing the strength of the brazed joint is virtually eliminated.

Advantageously, the invention may also be practiced with a relatively wide spacing between the individual bores. Thus, even large brazing surfaces can be structured in an economical manner.

As in the hitherto known brazing methods, the material parts which are to be joined are subjected to ultrasonic cleaning after the structuring operating of the brazing surface. The final joint is made using conventional brazing materials, under known process conditions, in a high-temperature, high-vacuum brazing oven.

The invention is explained in more detail below by reference to the following examples.

EXAMPLE 1

A composite comprising a plate-shaped part of carbon fiber-reinforced graphite (CFC) having dimensions of 50×30×10 mm, and a plate-shaped part of the molybdenum alloy TZM having the same dimensions, was made by the method according to the invention. For this purpose, the graphite part was structured on its brazing surface with conical bores of at most 0.2 mm diameter and 0.75 mm depth at a bore center spacing of 0.25 mm. The bores were made by means of a pulsed Nd-YAG laser operating under the following conditions: Frequency, 100 Hz; pulse length, 0.1 ms; pulse energy 0.85 joule; objective focal length, 100 mm; Gas, $O_2$ operating at a pressure of 3.5 bar; and a feed rate of the CFC part past the laser of 1.8 m/minute.

Subsequently, the CFC part and the TZM part were cleaned in an ultrasonic bath. A 0.2 mm thick foil of zirconium brazing material was then applied to the structured surface of the CFC part, and the TZM part was positioned on top thereof. This brazing assembly was then introduced into a high-temperature, high-vacuum brazing oven and heated, within 20 minutes, to a brazing temperature of 1700° C. The assembly was held at this temperature for 5 minutes. The oven was then cooled under vacuum to room temperature. The composite produced according to the invention was non-destructively tested by means of ultrasonics. The brazed joint did not show any cracks or cavities.

For comparison, a composite was produced from the same materials and with the same dimensions, in which the surface of the CFC part was structured with grooves by a conventional turning operation according to the state of the art. The production conditions were the same as in the case of the composite produced according to the invention.

In a shearing test, the strengths of the brazed joints of the two composites were compared with one another. In the case of the composite which was produced according to the state of the art, fracture occurred in the brazing material layer at a shearing force of 15 KN. By contrast, in the case of the composite produced according to the invention, fracture occurred at 21 KN in the CFC part itself, because the inherent strength of the CFC material was exceeded. The brazed joint itself remained 19 undamaged.

EXAMPLE 2

A disk-shaped composite comprised of a polycrystalline graphite part of 100 mm diameter and 20 mm thickness, and an annular part of a tungsten alloy having a rhenium content of 10% by weight and an external diameter of 100 mm, an internal diameter of 50 mm and a thickness of 1 mm, was produced by the process according to the invention in the same way as the composite according to Example 1.

For comparison, a second composite was produced from the same materials and with the same dimensions, wherein the surface of the graphite part was structured with grooves by a turning operation according to the state of the art. The production conditions were the same as in the case of the composite produced according to the invention.

Thermomechanical shock tests were carried out on both composites. For this purpose, the composites were heated, within 1 minute, from room temperature to 600° C., and then quenched in water to room temperature.

In the second composite which had been produced according to the state of the art, lifting of the annular tungsten/rhenium part from the graphite part was found after 8 temperature cycles. By contrast, in the case of the composite produced according to the invention, no impairment of the brazed joint of the composite material was yet detectable even after 20 temperature cycles.

It will be apparent that other and further forms of the invention may be devised without departing from the spirit and scope of the appended claims, it being understood that the invention is not limited to the specific embodiments described.

We claim:

1. A method of making high-strength brazed joints in metal/ceramic and ceramic/ceramic composite materials, said method followed by a brazing operation, wherein said method comprises subjecting a ceramic material surface to be brazed to a structuring operation before said brazing operation in order to obtain an enlarged brazing surface area, said structuring operation effected by forming bores through said ceramic material surface without penetrating through the depth of said ceramic material, said bores having an average diameter in the range of 50 $\mu$mm-500 $\mu$m and a depth in the range of 100 $\mu$m-2 mm.

2. The method of making high-strength brazed joints as claimed in claim 1, wherein the bores are conically shaped.

3. The method of making high-strength brazed joints as claimed in claim 2, wherein the bores are introduced by means of a laser.

4. The method of making high-strength brazed joints as claimed in claim 1, wherein the individual bores have identical diameters, identical depths and identical spacings.

5. The method of making high-strength brazed joints as claimed in claim 1, wherein at least 10% of the surface area to be brazed is structured by means of bores.

6. The method of making high-strength brazed joints as claimed in claim 2, wherein the individual bores have identical diameters, identical depths and identical spacings.

7. The method of making high-strength brazed joints as claimed in claim 3, wherein the individual bores have identical diameters, identical depths and identical spacings.

8. The method of making high-strength brazed joints as claimed in claim 2, wherein at least 10% of the surface area to be brazed is structured by means of bores.

9. The method of making high-strength brazed joints as claimed in claim 3, wherein at least 10% of the surface area to be brazed is structured by means of bores.

10. The method of making high-strength brazed joints as claimed in claim 4, wherein at least 10% of the surface area to be brazed is structured by means of bores.

11. The method of making high-strength brazed joints as claimed in claim 6, wherein at least 10% of the surface area to be brazed is structured by means of bores.

12. The method of making high-strength brazed joints as claimed in claim 7, wherein at least 10% of the surface area to be brazed is structured by means of bores.

* * * * *